United States Patent Office 3,152,603
Patented Oct. 13, 1964

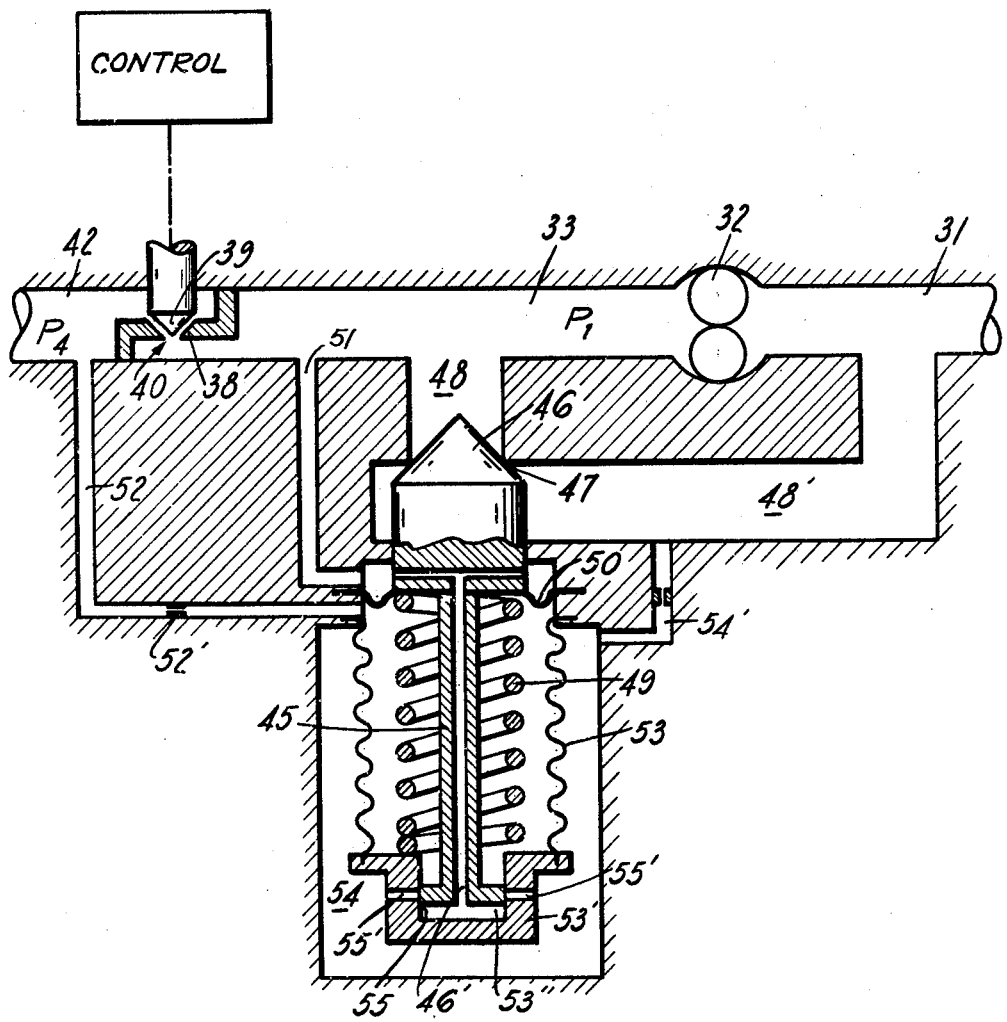

3,152,603
CONSTANT HEAD CONTROL VALVE
Harry C. Zeisloft, Brookfield, Wis., assignor to The Bendix Corporation, a corporation of Delaware
Application Sept. 16, 1957, Ser. No. 684,368, which is a continuation of application Ser. No. 248,402, Sept. 26, 1951. Divided and this application Dec. 22, 1961, Ser. No. 168,294
5 Claims. (Cl. 137—117)

This invention relates to a head control valve and more particularly a head control for controlling a constant head or pressure differential across a variable orifice.

This application is a division of my application Serial No. 684,368, filed September 16, 1957, which in turn is a continuation of my application Serial No. 248,402 filed September 26, 1951, covering "Fuel Feed and Power Control System For Gas Turbine Engines," now abandoned.

It is an object of the present invention to provide a spring loaded head control valve having means to maintain spring length constant at all valve positions to avoid spring induced errors.

Other objects and advangtages will become apparent on consideration of the description and drawing.

Referring to the drawing there is illustrated a constant head valve in cooperation with a fluid supply system schematically illustrated such as a fuel supply system of the type more completely described in my referenced parent application Serial No. 684,368 now abandoned.

Fuel comes in from a source of supply by way of conduit 31, in which is mounted a fuel pump 32, arranged to deliver the fuel under pressure to the control device through a conduit 33. The capacity of the pump should be such as to insure a supply of fuel equal to or in excess of engine demands.

The fuel flows from conduit 33 through an outlet orifice 38 which coacts with a valve member 39 to provide a variable metering orifice 40. Valve member 39 is adapted to be controlled by control 30 in response to certain parameters of engine operational conditions in a manner more fully set forth in my referenced parent application. Metering orifice 40 controls the flow of metering fuel into discharge conduit 42 where it is adapted to be delivered to an engine.

A constant metering head is maintained across the metering orifice 40 so that area only becomes the metering or flow-rate variable subject to regulation. This is accomplished by a by-pass valve 46, adapted to control an orifice or port 47 in return conduit 48, and having an elongated stem 45 formed with a central passage 46′, which latter vents $P_1$ pressure to a chamber 53″ at the lower end of the said stem. A spring 49 serves to normally urge valve 46 to seated position in opposition to the differential created across a diaphragm 50, the latter being vented on one side to $P_1$ or fuel inlet pressure by way of passage 51 and on its opposite side to $P_4$ or metered fuel pressure by way of passage 52 having a restriction 52′ therein. The valve stem and spring assembly is mounted in a bellows 53 having a spring-seating base 53′ defining the chamber 53″, the said bellows and base in turn being mounted in a chamber 54, vented by a restricted passage 54′ to the passage 48′ to prevent possible entrapment of fuel and vapor in chamber 54. The lower end of the valve stem 46′ is provided with a pilot valve land 55, adapted to coact with ports 55′, formed in the base 53′ of bellows 53.

To explain the operation, it should first be understood that the object of the valve assembly as shown and described is to maintain the spring length and hence its force substantially constant at all positions of the valve 46.

The pilot valve arrangement at the bottom of the bellows tends to maintain a differential across the bellows as required to support the spring at a predetermined load. Should the valve 46 open, due to an increase in the differential across diaphragm 50 beyond a preset value, and tend to compress the spring 49, the land 55 will be moved relatively to valve base 53′ and the ports 55′ will open and permit fuel to flow from chamber 54 to the interior of the bellows. The increased spring force now acting on the base 53′ will cause the bellows to extend until the ports 55′ again align with the land 55, at which time the spring load attains its original value. Should the valve 46 close or move toward closed position due to a decrease in the differential across diaphragm 50 and tend to extend the spring 49, land 55 will move upwardly relatively to ports 55′ and fuel at $P_1$ pressure will flow through passage 46′ and ports 55′ to the chamber 54. The bellows will now collapse until ports 55′ again align with land 55 and spring load attains its original value. The effective area of the bellows 53 is appreciably greater than that of the diaphragm 50 to insure proper operation of the valve. The above-described valve supporting arrangement serves to always maintain a substantially constant spring force as the valve opens and closes.

Since the diaphragm 50 is vented to $P_1$ minus $P_4$ pressure, the metering head or differential will remain at a constant value at all fuel flows as determined by the force of the spring 49.

Although only one form of the constant head control valve embodying the invention has been schematically illustrated and described, it will be understood that certain changes in construction and arrangement of parts may be necessary to adapt the control valve to actual physical requirements, such changes and modifications being obvious to those skilled in the art.

I claim:

1. Fluid pressure regulator means comprising valvular means, means responsive to a fluid pressure differential for actuating said valvular means, resilient means of predetermined extension opposing actuation of said valvular means by said pressure responsive means, a movable pressure responsive member abutting one end of said resilient means, and a pilot valve movable with said valvular means, said pilot valve being adapted to control the pressure to which said member responds in such a manner that the extension of said resilient means is held substantially constant throughout the range of travel of said valvular means.

2. In combination, a first fluid flow conduit, flow pumping means for pumping fluid through said conduit, a movable fluid throttling valve in said conduit, a second fluid flow conduit connecting said first conduit to a source of low pressure fluid, and means in said second conduit for maintaining a constant fluid pressure drop across said throttling valve including valvular means, movable wall means responsive to said pressure drop and connected to said valvular means for actuating same, resilient means operatively connected to said movable wall means for establishing a predetermined constant value of said pressure drop, pressure responsive means functionable as a movable abutment for said resilient means and a pilot valve movable with said valvular means for controlling the fluid pressure to which said movable abutment means responds in such a manner that said latter means maintains said resilient means at constant length irrespective of variations in the position of said valvular means.

3. A head regulating device for controlling a substantially constant pressure differential across a fluid control orifice comprising: a valve member operative to vary fluid flow through said fluid control orifice and thereby alter the pressure differential thereacross; a first pressure responsive member connected to said valve member and responsive to the fluid pressure differential across said fluid control orifice to provide a first control force for positioning said valve member proportional to the pressure differential to be controlled; a spring member connected on one end to said valve member to provide a second control force opposing said first control force thereby establishing a force balance at a selected pressure differential; a movable retainer connected to the other end of said spring member movable to vary said second control force; a second pressure responsive member connected to said retainer to control its position; pilot valve means movable in response to deviation of said spring member from a predetermined length operative to control fluid pressure acting on said second pressure responsive member and position said retainer in a direction to reduce said spring length deviation.

4. A head regulating device for controlling a substantially constant pressure differential across a fluid control orifice comprising: a valve member operative to vary fluid flow through said fluid control orifice and thereby alter the pressure differential thereacross; a first pressure responsive member connected to said valve member and responsive to the fluid pressure differential across said fluid control orifice to provide a first control force for positioning said valve member proportional to the pressure differential to be controlled; a spring member connected on one end to said valve member to provide a second control force opposing said first control force thereby establishing a force balance at a selected pressure differential; a movable retainer connected to the other end of said spring member to control spring length and said second control force; a second pressure responsive member connected to said retainer to control its position; pilot valve means operative to control fluid pressure acting on said second pressure responsive member and control the position of said retainer; said pilot valve means being responsive to relative movement between said valve member and said retainer to maintain said spring member at a substantially constant length therebetween.

5. A head regulating device as claimed in claim 4 wherein said pilot valve means is comprised of an elongated stem secured to said valve member having a valve land at its remote end and a fluid control port in said retainer operative with said valve land to provide a servo control orifice responsive to relative displacement between said valve member and said retainer.

References Cited in the file of this patent
UNITED STATES PATENTS

| 2,149,390 | Donaldson | Mar. 7, 1939 |
| 2,616,254 | Mock | Nov. 4, 1952 |